United States Patent [19]

Elks

[11] Patent Number: 4,618,845
[45] Date of Patent: Oct. 21, 1986

[54] MULTI-MODAL PROXIMITY SENSOR SYSTEM

[76] Inventor: William J. Elks, 1310 Cary Way, San Diego, Calif. 92109

[21] Appl. No.: 655,561

[22] Filed: Sep. 28, 1984

[51] Int. Cl.$^4$ .......................... B60Q 1/00; H01H 3/16
[52] U.S. Cl. ...................................... 340/61; 180/274; 200/61.44; 200/DIG. 10
[58] Field of Search .................... 340/61, 51, 686, 540, 340/988, 601; 200/61.42, 61.44, DIG. 10; 116/28 A; 180/274; 73/189

[56] References Cited

U.S. PATENT DOCUMENTS

| | | | |
|---|---|---|---|
| 2,780,937 | 2/1957 | Haynes et al. | 73/189 |
| 2,812,397 | 11/1957 | Taylor | 200/61.44 |
| 3,219,972 | 11/1965 | Williams | 340/61 |
| 3,234,507 | 2/1966 | Bohn | 340/61 |
| 3,611,286 | 10/1971 | Cleveland | 340/61 |
| 4,042,816 | 8/1977 | Smoot | 340/61 X |
| 4,390,862 | 6/1983 | Elks | 340/61 |

Primary Examiner—James L. Rowland
Assistant Examiner—Thomas J. Mullen, Jr.
Attorney, Agent, or Firm—Ralph S. Branscomb

[57] ABSTRACT

A multi-modal proximity sensor system includes one or more individual sensor units which are two-stage dual ring contact units but are flexible enough to be made as a single stage unit by omitting a single ring contact and a connector resistor. When used in either mode, a probe when deflected by proximity to an object will set off a buzzer alarm as well as a light alarm upon touching a ring contact. In the preferred embodiment (i.e., the two-stage embodiment), as soon as the probe deflects beyond a first predetermined level, a first stage alarm is generated, and as the probe is deflected past a second level, a second stage alarm is generated, which constitutes an increase in volume of the audible signal, and brighter light in the visual signal. In addition, overall sensitivity is easily adjustable by the axial adjustment of the probe within the body of the indicator unit relative to the contact rings.

9 Claims, 6 Drawing Figures

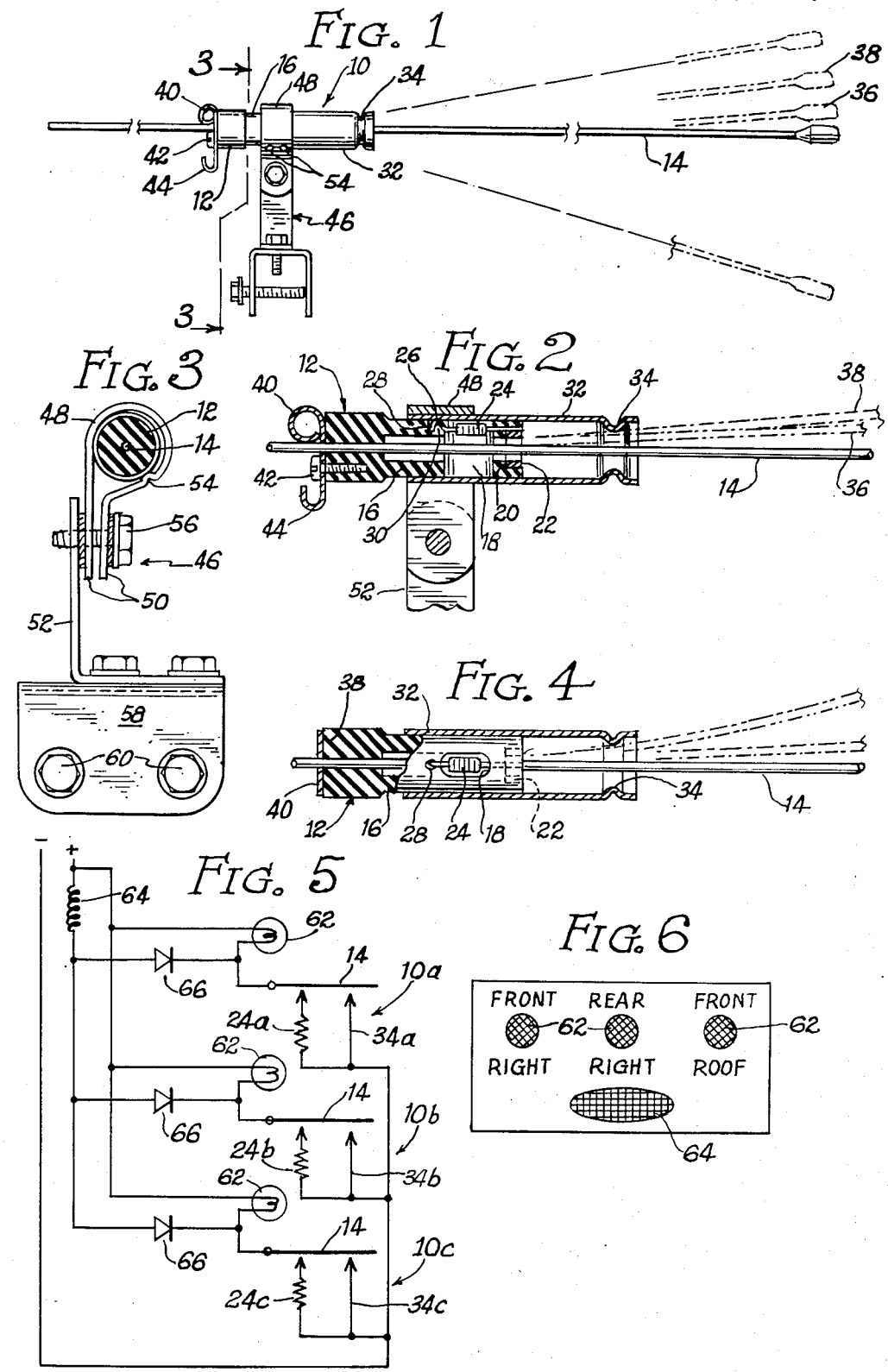

MULTI-MODAL PROXIMITY SENSOR SYSTEM

BACKGROUND OF THE INVENTION

Proximity sensors or "curb sensors" for cars and other motorized vehicles have generally taken the form of an elongated, coiled sheet metal probe which is clamped to the inside of the fender and projects to the position the curb would assume alongside the vehicle when parking. The actual physical scraping sound of the probe on the curb indicates when the vehicle is sufficiently close to the curb for parallel parking, for example. Otherwise, it indicates at which point the car is in danger of having its whitewalls scratched up.

This system worked reasonably well in the 1950's, when air conditioning was all but unheard of in cars. However, as cars become increasingly luxurious and complex, with air conditioning and high quality stereo sound systems, the effectiveness of the physical scraping sound of a metal rod on the curb as an alert is virtually non-existent.

To remedy this, several curb sensors, or proximity sensors, which have internally actuable alarms, such as a light or a buzzer, have been invented. One was invented by the instant inventor and bears U.S. Pat. No. 4,390,862, and was issued June 28, 1983. Another sensor system developed by the instant inventor is described in U.S. Pat. No. 4,460,889, issued July 17, 1984.

These units work very well for the purpose for which they were intended, that is, they can be arranged individually or in duplicate or triplicate on a vehicle and will indicate when the probe has been deflected by means of an audible or visual signal on the dashboard.

There are, however, more sophisticated implementations of the above inventions which would provide the driver with even more information about his position vis-a-vis external objects, and which would be particularly apropos for use with large vehicles and recreational vehicles which may have overhead clearance problems, as well as front and rear curb clearance difficulty.

SUMMARY OF THE INVENTION

The instant invention fulfills the need for a more sophisticated proximity sensor system. In at least two ways, the invention provides improved features beyond the prior art described above. First, each individual sensor unit is a two-stage unit which is flexible enough to be made as a single stage unit by omitting a single ring contact and a connector resistor. When used in either mode, the probe of the indicator will set off a buzzer alarm as well as a light alarm. In the preferred embodiment (i.e., the two-stage embodiment), as soon as the extended probe deflects beyond a first pre-determined level, and as the probe is deflected past a second level, the second stage alarm is sounded, which constitutes an increase in volume of the audible signal, and brighter light in the visual signal. In addition, overall sensitivity is easily adjustable by the axial adjustment of the physical probe within the body of the indicator unit.

Thus, with the two-stage alert, the driver of an RV or the like can jockey with the vehicle not only until the first stage alarm indicates that he is within the legal limit of the curb, for example, for proper parking, but also will indicate when the vehicle is dangerously close to the curb and in danger of scraping the tires, as well as possibly causing damage to the wheel and alignment.

In addition, RV's and other larger vehicles have a need to determine the overhead clearance. Otherwise, an RV is in danger of losing its air conditioner to gas station overheads, country bridges, and the like. To accommodate an additional probe on the roof of the vehicle, as well as one or two or even more on the sides and elsewhere, the probe can be utilized in a circuit system described below which utilizes a common buzzer and an additional light for each of the indicator units used. The circuit is such that the sensors can be used bank after bank, if desired, with additional lights and minor circuitry being added in the form of modules to accommodate more probes.

Thus, the driver will have a bank of lights, and a buzzer, which will not only identify which of the sensors, and thus which part of the vehicle, is approaching dangerously close to an object, but would also provide this information in two increments, providing the ultimate in external object proximity sensing for motor vehicles.

BRIEF DESCRIPTION OF THE DRAWINGS

FIG. 1 is a side elevation view of a proximity sensor unit indicating the two stages of deflection of the probe;

FIG. 2 is a section taken longitudinally through the probe in the plane of the paper as the probe is shown in FIG. 1;

FIG. 3 is a section taken along FIG. 3—3 of FIG. 1;

FIG. 4 is a partial horizontal section, partially cut-away, of the body of the proximity sensor;

FIG. 5 is a diagrammatic illustration of a circuit utilizing three of the indicators; and FIG. 6 illustrates a typical example of how the modular alarm element would look on the dashboard.

DETAILED DESCRIPTION OF THE PREFERRED EMBODIMENTS

An individual proximity indicator unit is shown at 10. It comprises a body portion having an elongated, cylindrical plug 12 which mounts or fixes a probe 14 at one end, permitting the remainder to extend outwardly, to the right as indicated in FIG. 2. The probe has a forwardly extending, hollow cylindrical collar 16, which has an oval bore passing through from top to bottom at 18, as indicated in side section in FIG. 2, and from the top in FIG. 4. Forward of this bore, the collar defines a seat 20 for a primary contact ring 22. This ring has a resistor 24 connected to it. The ring is brass or some other conductive material, and the other end of the resistor is hooked as at 26, with the tip of the hook being inserted in the hole 28 which defines a boss 30. The hole 28 in the boss 30 will hold the loop up extending outside the circumference of the collar of the plug, into contact with the metallic sleeve 32 which is frictionally inserted over the collar portion of the plug. In other words, the end of the resistor to the left in FIG. 2 makes electrical contact with the interior surface of the sleeve 32.

The primary contact ring already having been described at 22, a secondary contact ring is now formed by an annular dimple 34, formed into the sleeve 32. This simple structure thus far defined actually constitutes the two-stage sensor of the proximity indicating unit. As the probe is deflected as shown in both FIGS. 1 and 2, to the deflection indicated at 36, the primary ring 22 is contacted by the probe. This completes a circuit through the probe and into the sleeve 32. Otherwise, because the plug 12 is an insulator, there would be no contact between the probe and the sleeve.

As the probe is further deflected in the position indicated at 38, it is bent into contact with the secondary ring 34, making direct contact between the probe and the sleeve. Thus, when the probe directly contacts the dimple ring in the sleeve, it in effect by-passes or shorts out the resistor 24.

Turning briefly to the remaining structure of the sensor, at the rear or butt end of the plug, indicated at 38, there is a tension clamp 40, which is fastened by means of screw 42 into the end of the insulating plug. This clamp serves the dual function of applying sufficient lateral force against the probe to hold it in the plug unless it is snagged on an object, and also provides the contact between the probe and a circuit wire by virtue of a terminal 44. The wire connected to the terminal 44 passes through the alarm or signal part of the unit and then to ground, and the sleeve 32 is grounded by means of its attachment to a conductive part of the vehicle with the mounting bracket assembly 46. Thus it can be seen that a complete circuit is established by deflection of the probe to either level 36 or 38 indicated in FIGS. 1 or 2.

One of the principal features of the unit lies in the fact that the two-stage indicator is constructed so that it can be very simply created as a one-stage indicator instead. Because the primary contact ring 22 merely rests, albeit snugly, in the seat 20, the rear tip of the lead for resistor 24 can be slipped out of the hole 28 (or never slipped in in the first place), the ring can be slipped out of its seat, so that the primary stage is in effect removed (or never installed in the first place). Naturally, this is done without the sleeve 32 in place. This unique construction permits the one and two stage versions of the proximity sensor to be produced, and inventoried, with no duplication of effort whatsoever other than the production and maintenance of an inventory of the tiny primary contact rings and the resistors attached to them.

Before getting to the circuitry of the multiple probe arrangement, the mounting bracket assembly 46 will be discussed in somewhat more detail. The first part of the bracket which contacts the actual probe assembly is a metallic strap 48 which wraps around the sleeve 32, terminating in ends 50 having bolt holes to permit them to be bolted to the L-shaped member 52. The strap 48 is provided with a couple of dimples 54 which are strategically located as shown in FIG. 3 to permit them to be leveraged down against the side of the relatively thin-walled sleeve 32, deforming the sleeve as shown in FIG. 3 against the plug 12. This permits the single strap 48 to fix itself, the sleeve and the plug against relative axial motion. At the initial installation or subsequently, however, the strap can be loosened to permit the sliding of the sleeve outwardly or inwardly on the plug collar, as shown in FIG. 2. This has the effect of increasing or decreasing the threshold of the second stage alert, or the only alert, if the single stage embodiment is used.

The strap is held onto the L member by double lock washers and self-threading bolt 56, so that it is a very secure connection and will not shake loose in use. The L, in turn, is bolted to the U-shaped mounting bracket 58, whose self-tapping bolts 60 make a secure connection to the fender or other part of the vehicle. The U-bracket could be removed entirely to permit the leg of the L-shaped member to be bolted directly to the sheet metal of the vehicle, such as to the roof of an RV so that the probe could extend above the top of the air conditioner unit.

Turning now to the circuitry which enables multiple units to be connected to one console alarm, the proximity indicators will be indicated as 10a, 10b, and 10c, each of which has the primary ring and resistor, together indicated as 24a, 24b, and 24c, and the secondary ring, diagrammatically illustrated as a contact and indicated at 34a, 34b, and 34c. Without further complicating the diagram by triplicating all numerals, the probes are shown at 14, the respective visual alarms or lights at 62, the common buzzer at 64, and diodes at 66. It will be apparent from the circuit diagram that when any one of the indicators is actuated, to either the first or second stage level, its respective light 62 is illuminated, and the buzzer is actuated by current flowing through the respective diode 66. The diodes of the other indicators prevent back current from illuminating their respective lights. Thus, each indicator requires its own light, which is necessary so that the driver can know which probe is being actuated, and a common buzzer will alert the driver, who will not ordinarily be staring at the light console, to the fact that one of the probes is touching something.

A typical modular unit is shown in FIG. 6. A unit such as this could be duplicated for more than three indicator units, or of course, units in multiples of three could be provided. A single light and buzzer unit could be provided with modular addons of the individual lights for the additional indicators.

In any event, the unit as provided is very flexible in that they can be used or manufactured as a single stage proximity indicator or a dual stage indicator. The overall sensitivity, as well as the desired triggering proximity, can be adjusted by axially sliding the probe within the insulating plug against the friction of the tensioning clamp 40. The second stage sensitivity is also adjustable as indicated above by axially sliding the sleeve relative to the insulating plug.

Additional flexibility, even beyond the one- or two-stage alert option, is provided by the intrinsic ability of the units to be ganged in units of two, three, or however many are desired by the use of the circuit shown in FIG. 5. The console indicated at 66 makes it easy for the driver to first be alerted to the contact of one of his probes by the buzzer, then identify from the illuminated light which probe is being contacted, and subsequently realizing when the proximity situation is becoming dangerous by virtue of the second stage visual alarm. The system as indicated is thus a very flexible, sophisticated implementation of the proximity indicating concept which integrates electronics into the indicator at a time when the physical isolation of the driver, and the size of the vehicle, make it impossible for mechanical scrapers to be of any real benefit.

I claim:
1. A two-step proximity indicator comprising:
 (a) an elongated, electrically conductive normally substantially straight probe;
 (b) a probe mounting means fixing a fixed end of said probe with an extending portion of said probe extending to terminate in a distal end;
 (c) said probe mounting means also mounting a primary and a secondary contact ring, said rings being axially spaced along the extending portion of said probe, such that upon increasing the deflection of said probe from straight, it contacts first said primary ring, and subsequently said secondary ring; and,

(d) an electrical alarm wired into a circuit which includes said rings and said probe such that said circuit is open until said probe touches either of said contact rings, closing said circuit to actuate said alarm, said circuit including a means therein producing a different signal from said alarm depending on which contact ring has been contacted by said probe;

(e) said means to produce a different signal comprising a resistor wired between said primary contact and the rest of the circuit such that upon contacting said primary ring, a diminished current flows in said circuit, because of said resistor, producing a diminished signal; and, (f) said resistor is omissible or removable with said primary ring without destroying the integrity of the circuit through said secondary contact ring.

2. A two-step proximity indicator comprising:

(a) an elongated, electrically conductive normally substantially straight probe;

(b) a probe mounting means fixing a fixed end of said probe with an extending portion of said probe extending to terminate in a distal end;

(c) said probe mounting means also mounting a primary and a secondary contact ring, said rings being axially spaced along the extending portion of said probe, such that upon increasing the deflection of said probe from straight, it contacts first said primary ring, and subsequently said secondary ring; and, (d) an electrical alarm wired into a circuit which includes said rings and said probe such that said circuit is open until said probe touches either of said contact rings, closing said circuit to actuate said alarm, said circuit including a means therein producing a different signal from said alarm depending on which contact ring has been contacted by said probe;

(e) said means to produce a different signal comprising a resistor wired between said primary contact and the rest of the circuit such that upon contacting said primary ring, a diminished current flows in said circuit, because of said resistor, producing a diminished signal;

(f) said probe mounting means comprising an insulative plug having a base portion fixing the fixed end of said probe therein, and a forwardly extending collar releasably mounting said primary contact ring and in encircling relation to said probe, such that said primary ring can be omitted or removed to make said indicator a one-stage system having only the secondary contact ring in the circuit.

3. Structure according to claim 2 wherein said primary ring has a resistor attached thereto interposed between sid primary ring and the rest of the circuit, and said resistor is omissible or removable with said primary ring.

4. Structure according to claim 3 and including a conductive sleeve encircling said plug and extending forwardly of said primary ring to define said secondary ring by means of an annular dimple in said sleeve.

5. Structure according to claim 4 wherein the forwardly extending collar of said plug defines an annular shoulder to seat said primary ring, and a boss adjacent the exterior of said plug to support a looped wire contact of said resistor against and in electrical contact with said sleeve such that removal of said sleeve frees said looped wire contact and permits removal of said resistor and said primary contact ring.

6. Structure according to claim 5 wherein said probe extends out the rear end of said plug and is maintained fixed to said plug against axial forces below a pre-determined threshold force by a tension clamp fastened to a rear end of said plug.

7. Structure according to claim 6 wherein said sleeve is mounted in a mounting bracket assembly to be fastened to a grounded part of a vehicle body, and said tension clamp has an integral wire terminal for connecting a wire from said circuit such that the circuit through said indicator is defined by, in sequence, said tension clamp, said probe, said secondary ring or both of said rings, and said mounting bracket.

8. Structure according to claim 7 wherein said bracket assembly comprises a rigid sleeve strap encircling said sleeve and having superimposed ends with mating holes therein, a connecting "L" rotatably adjustably bolted to said ends, and a U-shaped mounting bracket bolted to said "L" such that said mounting bracket can be removed to permit bolting said "L" directly to the sheet metal of a vehicle body.

9. Structure according to claim 8 wherein said strap has at least one inwardly directed dimple in the part thereof encircling said sleeve near one of said ends such that bolting said ends together lever at least one said dimple against said sleeve, deforming same to hold said plug, sleeve, strap and probe together to prevent relative axial motion thereof.

* * * * *